United States Patent
Liu et al.

(10) Patent No.: US 11,166,002 B2
(45) Date of Patent: Nov. 2, 2021

(54) METHOD AND DEVICE FOR LIVE BROADCASTING VIRTUAL AVATAR

(71) Applicant: Beijing Dajia Internet Information Technology Co., Ltd., Beijing (CN)

(72) Inventors: Xiaoqiang Liu, Beijing (CN); Liqian Ma, Beijing (CN); Guoxin Zhang, Beijing (CN); Xuwei Huang, Beijing (CN); Böning Zhang, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/035,322

(22) Filed: Sep. 28, 2020

(65) Prior Publication Data

US 2021/0029339 A1    Jan. 28, 2021

(30) Foreign Application Priority Data

Sep. 29, 2019 (CN) .......................... 201910935851.8

(51) Int. Cl.
| | |
|---|---|
| *H04N 13/117* | (2018.01) |
| *G06F 3/01* | (2006.01) |
| *G06T 19/00* | (2011.01) |
| *H04N 21/2187* | (2011.01) |

(52) U.S. Cl.
CPC .......... *H04N 13/117* (2018.05); *G06F 3/011* (2013.01); *G06T 19/006* (2013.01); *H04N 21/2187* (2013.01)

(58) Field of Classification Search
CPC .. H04N 13/117; H04N 21/2187; G06F 3/011; G06T 19/006
See application file for complete search history.

(56) References Cited

U.S. PATENT DOCUMENTS

| | | | |
|---|---|---|---|
| 2012/0127170 A1* | 5/2012 | Varadhan | G06T 19/00 345/419 |
| 2018/0196526 A1 | 7/2018 | Dimitrov et al. | |
| 2018/0276874 A1* | 9/2018 | Myhill | G06T 7/20 |

FOREIGN PATENT DOCUMENTS

| | | |
|---|---|---|
| CN | 105828090 | 8/2016 |
| CN | 109195020 | 1/2019 |

OTHER PUBLICATIONS

Sep. 10, 2020 Chinese Office Action from related CN 201910935851.8 (5 pgs).

* cited by examiner

*Primary Examiner* — Chong Wu
(74) *Attorney, Agent, or Firm* — Knobbe, Martens, Olson & Bear, LLP (57) ABSTRACT

The present disclosure discloses a method and device for living broadcasting a virtual image. A user can watch the virtual image video in multiple angles, and no clipping occurs when the user adjusts a watching angle as required, thereby improving the user experience.

18 Claims, 6 Drawing Sheets

METHOD AND DEVICE FOR LIVE BROADCASTING VIRTUAL AVATAR

CROSS-REFERENCE TO RELATED APPLICATION

This application is based on and claims priority under 35 U.S.C. 119 to Chinese Patent application No. 201910935851.8, filed on Sep. 29, 2019, in the China National Intellectual Property Administration. The entire disclosure of the above applications is incorporated herein by reference.

FIELD

The present disclosure relates to the field of computer, and particularly relates to a method and device for live broadcasting a virtual image.

BACKGROUND

At the present, in the technical field of video live broadcasting, a virtual image live broadcasting method is usually that: after a watching client creates and plays a virtual image video according to received anchor expression information, human skeleton information and scene information which are transmitted by a live broadcasting client, a user of the watching client watches the virtual image video from a fixed watching angle.

SUMMARY

The present disclosure provides a method and device for live broadcasting a virtual image, so as to at least solve the problem that the user experience is not high enough since a watching angle cannot be adjusted in the related art.

Embodiments of the present disclosure disclose a method for live broadcasting a virtual image, applied to a watching client, the method including: creating and playing a video of the virtual image; detecting whether an instruction for adjusting a current position of a virtual camera is received while the video is playing; acquiring first target coordinate information of the virtual camera based on the instruction in response to that the instruction is detected to be received; moving the virtual camera from the current position to a first target coordinate position based on the first target coordinate information; acquiring a first convex hull corresponding to an anchor of the virtual image; acquiring second convex hulls corresponding to objects in a scene of the video; detecting whether first image clipping occurs based on the first convex hull and the second convex hulls, where the first image clipping occurs when the virtual camera is sheltered by any of the objects located between the virtual camera and the anchor and/or when the virtual camera enters into any of the objects or the anchor; acquiring second target coordinate information by adjusting the first target coordinate information in response to that the first image clipping is detected to be occurred; and moving the virtual camera from the first target coordinate position to a second target coordinate position, where the first image clipping does not occur, based on the second target coordinate information.

In some embodiments, the detecting whether the first image clipping occurs based on the first convex hull and the second convex hulls includes: detecting whether second image clipping occurs in an image of the anchor based on the first convex hull; moving the virtual camera from the first target coordinate position to an undetermined position in response to that the second image clipping occurs, where the second image clipping does not occurs in the image of the anchor on the undetermined position; acquiring a third convex hull corresponding to the virtual camera at the undetermined position; detecting whether third image clipping occurs in the scene based on the third convex hull and the second convex hulls; determining that the first image clipping occurs in response to that the third image clipping occurs; and determining that the first image clipping does not occur in response to that the third image clipping does not occur.

In some embodiments, the method further includes acquiring a fourth convex hull corresponding to the virtual camera at the first target coordinate position in response to that the second image clipping does not occur; detecting whether the third image clipping occurs based on the fourth convex hull and the second convex hulls; determining that the first image clipping occurs in response to that the third image clipping occurs; and determining that the first image clipping does not occur in response to that the third image clipping does not occur.

In some embodiments, the first convex hull is: a circumscribed sphere of a three-dimensional model of the anchor; and the detecting whether the second image clipping occurs in the image of the anchor based on the first convex hull includes: acquiring coordinate information of a preset observation point, where the preset observation point is a fixed point on the anchor; calculating a first vector from a coordinate of the preset observation point to a coordinate of the virtual camera; detecting whether a length of the first vector is less than a radius of the circumscribed sphere; determining that the second image clipping occurs in response to that the length of the first vector is less than the radius of the circumscribed sphere; and determining that the second image clipping does not occur in response to that the length of the first vector is not less than the radius of the circumscribed sphere.

In some embodiments, the first convex hull is: a convex hull calculated based on a three-dimensional model of the anchor and a gift wrapping algorithm; and the detecting whether the second image clipping occurs in the image of the anchor based on the first convex hull includes: acquiring a fourth convex hull corresponding to the virtual camera at the first target coordinate position; detecting whether an intersecting point exists between the fourth convex hull and the first convex hull; determining the second image clipping occurs in response to that the intersecting point exists between the fourth convex hull and the first convex hull; and determining the second image clipping does not occur in response to that the intersecting point does not exist between the fourth convex hull and the first convex hull.

In some embodiments, the undetermined position is a coordinate position that: causes a vector direction from the coordinate of the preset observation point to the coordinate of the virtual camera to be unchanged; and causes a vector length from the coordinate of the preset observation point to the coordinate of the virtual camera to be equal to the radius of the circumscribed sphere.

In some embodiments, the undetermined position is a coordinate position of a collision point where a convex hull of the virtual camera and a convex hull of the anchor are closest, where the collision point is a point where the convex hull of the virtual camera and the convex hull of the anchor intersect.

In some embodiments, the detecting whether the third image clipping occurs based on the third convex hull and the second convex hulls includes: detecting whether an intersecting point exists between the third convex hull and respective second convex hulls; determining the third image clipping does not occur in response to that the intersecting point does not exist between the third convex hull and the respective second convex hulls; and determining the third image clipping occurs in response to that the intersecting point exists between the third convex hull and any one of the second convex hulls.

In some embodiments, the acquiring the second target coordinate information includes: acquiring coordinates of collision points between the third convex hull and the respective second convex hulls; and acquiring the second target coordinate information based on the coordinates of the collision points and distances between the third convex hull and the respective second convex hulls, where the second target coordinate information includes the second target coordinate position.

In some embodiments, the detecting whether the third image clipping occurs based on the fourth convex hull and the second convex hulls includes: detecting whether an intersecting point exists between the fourth convex hull and the respective second convex hulls; determining the third image clipping does not occur in response to that the intersecting point does not exist between the fourth convex hull and the respective second convex hulls; and determining the third image clipping occurs in response to that the intersecting point exists between the fourth convex hull and any one of the second convex hulls.

In some embodiments, the acquiring the second target coordinate information includes: acquiring coordinates of collision points between the fourth convex hull and the respective second convex hulls; and acquiring the second target coordinate information based on the coordinates of the collision points and distances between the fourth convex hull and the respective second convex hulls, where the second target coordinate information includes the second target coordinate position.

Embodiments of the present disclosure provide a device for live broadcasting a virtual image, including a memory and at least one processor, where the at least one processor is configured to read and execute instructions stored in the memory to perform following operations: creating and playing a video of the virtual image; detecting whether an instruction for adjusting a current position of a virtual camera is received while the video is playing; acquiring first target coordinate information of the virtual camera based on the instruction in response to that the instruction is detected to be received; moving the virtual camera from the current position to a first target coordinate position based on the first target coordinate information; acquiring a first convex hull corresponding to an anchor of the virtual image; acquiring second convex hulls corresponding to objects in a scene of the video; detecting whether first image clipping occurs based on the first convex hull and the second convex hulls, where the first image clipping occurs when the virtual camera is sheltered by any of the objects located between the virtual camera and the anchor and/or when the virtual camera enters into any of the objects or the anchor; acquiring second target coordinate information by adjusting the first target coordinate information in response to that the first image clipping is detected to be occurred; and moving the virtual camera from the first target coordinate position to a second target coordinate position, where the first image clipping does not occur, based on the second target coordinate information.

In some embodiments, the at least one processor is further configured to read and execute instructions stored in the memory to perform following operations: detecting whether second image clipping occurs in an image of the anchor based on the first convex hull; moving the virtual camera from the first target coordinate position to an undetermined position in response to that the second image clipping occurs, where the second image clipping does not occurs in the image of the anchor on the undetermined position; acquiring a third convex hull corresponding to the virtual camera at the undetermined position; detecting whether third image clipping occurs in the scene based on the third convex hull and the second convex hulls; determining that the first image clipping occurs in response to that the third image clipping occurs; and determining that the first image clipping does not occur in response to that the third image clipping does not occur.

In some embodiments, the at least one processor is further configured to read and execute instructions stored in the memory to perform following operations: acquiring a fourth convex hull corresponding to the virtual camera at the first target coordinate position in response to that the second image clipping does not occur; detecting whether the third image clipping occurs based on the fourth convex hull and the second convex hulls; determining that the first image clipping occurs in response to that the third image clipping occurs; and determining that the first image clipping does not occur in response to that the third image clipping does not occur.

In some embodiments, the at least one processor is further configured to read and execute instructions stored in the memory to perform following operations: the first convex hull is: a circumscribed sphere of a three-dimensional model of the anchor; and the detecting whether the second image clipping occurs in the image of the anchor based on the first convex hull includes: acquiring coordinate information of a preset observation point, where the preset observation point is a fixed point on the anchor; calculating a first vector from a coordinate of the preset observation point to a coordinate of the virtual camera; detecting whether a length of the first vector is less than a radius of the circumscribed sphere; determining that the second image clipping occurs in response to that the length of the first vector is less than the radius of the circumscribed sphere; and determining that the second image clipping does not occur in response to that the length of the first vector is not less than the radius of the circumscribed sphere; where the undetermined position is a coordinate position that: causes a vector direction from the coordinate of the preset observation point to the coordinate of the virtual camera to be unchanged; and causes a vector length from the coordinate of the preset observation point to the coordinate of the virtual camera to be equal to the radius of the circumscribed sphere.

In some embodiments, the at least one processor is further configured to read and execute instructions stored in the memory to perform following operations: the first convex hull is: a convex hull calculated based on a three-dimensional model of the anchor and a gift wrapping algorithm; and the detecting whether the second image clipping occurs in the image of the anchor based on the first convex hull includes: acquiring a fourth convex hull corresponding to the virtual camera at the first target coordinate position; detecting whether an intersecting point exists between the fourth convex hull and the first convex hull; determining the second image clipping occurs in response to that the intersecting point exists between the fourth convex hull and the first convex hull; and determining the second image clipping does not occur in response to that the intersecting point does not exist between the fourth convex hull and the first convex hull; where the undetermined position is a coordinate position of a collision point where a convex hull of the virtual camera and a convex hull of the anchor are closest, where the collision point is a point where the convex hull of the virtual camera and the convex hull of the anchor intersect.

In some embodiments, the at least one processor is further configured to read and execute instructions stored in the memory to perform following operations: detecting whether an intersecting point exists between the third convex hull and respective second convex hulls; determining the third image clipping does not occur in response to that the intersecting point does not exist between the third convex hull and the respective second convex hulls; and determining the third image clipping occurs in response to that the intersecting point exists between the third convex hull and any one of the second convex hulls.

In some embodiments, the at least one processor is further configured to read and execute instructions stored in the memory to perform following operations: acquiring coordinates of collision points between the third convex hull and the respective second convex hulls; and acquiring the second target coordinate information based on the coordinates of the collision points and distances between the third convex hull and the respective second convex hulls, where the second target coordinate information includes the second target coordinate position.

In some embodiments, the at least one processor is further configured to read and execute instructions stored in the memory to perform following operations: detecting whether an intersecting point exists between the fourth convex hull and the respective second convex hulls; determining the third image clipping does not occur in response to that the intersecting point does not exist between the fourth convex hull and the respective second convex hulls; and determining the third image clipping occurs in response to that the intersecting point exists between the fourth convex hull and any one of the second convex hulls.

In some embodiments, the at least one processor is further configured to read and execute instructions stored in the memory to perform following operations: acquiring coordinates of collision points between the fourth convex hull and the respective second convex hulls; and acquiring the second target coordinate information based on the coordinates of the collision points and distances between the fourth convex hull and the respective second convex hulls, where the second target coordinate information includes the second target coordinate position.

BRIEF DESCRIPTION OF THE DRAWINGS

The drawings herein are incorporated in and constitute a part of the specification, illustrating embodiments consistent with the present disclosure and explaining the principles of the present disclosure together with the specification, and do not constitute improper limitations to the present disclosure.

DETAILED DESCRIPTION OF THE EMBODIMENTS

In order to make those of ordinary skill in the art better understand the technical solutions of the present disclosure, the technical solutions in the embodiments of the present disclosure will be described clearly and completely with reference to the accompanying drawings below.

It should be noted that the terms "first", "second", etc. in the specification and claims of the present disclosure and the above drawings are used to distinguish similar objects, and do not have to be used to describe a specific order or sequence. It should be understood that the data used in this way are interchangeable under appropriate circumstances so that the embodiments of the present disclosure described herein can be implemented in an order other than those illustrated or described herein. The implementation modes described in the following exemplary embodiments do not represent all embodiments consistent with the present disclosure. Rather, they are merely examples of devices and methods consistent with some aspects of the present disclosure as detailed in the appended claims.

Figure 1:
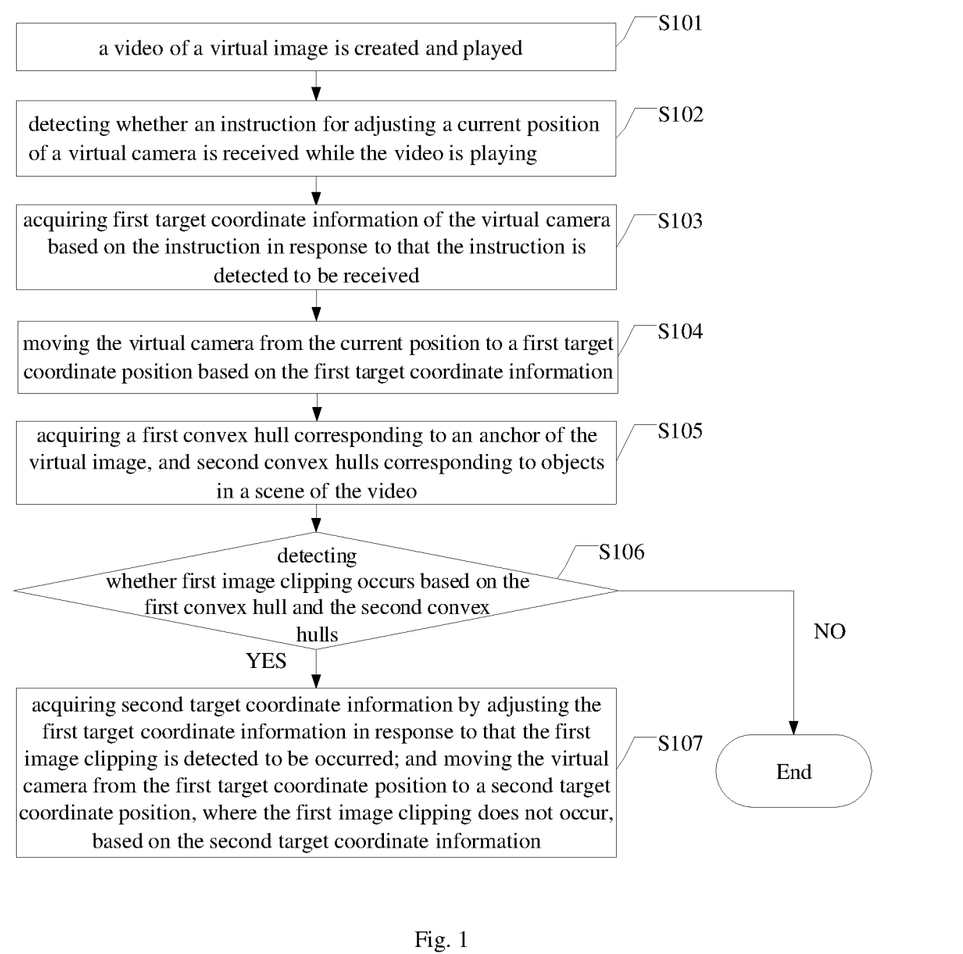
FIG. 1 is a flow diagram of a method for live broadcasting a virtual image according to an embodiment of the present disclosure.

FIG. 1 is a flow diagram of a method for live broadcasting a virtual image according to an embodiment of the present disclosure. The method includes S101 to S107.

At S101, a video of a virtual image is created and played.

In some embodiments, a watching client creates a face three-dimensional model of a virtual image anchor by using a preset blend shapes system according to received expression information of the anchor sent by a live broadcasting client; creates a body three-dimensional model of the anchor by using a preset skeletal skin system according to received human skeleton information of the anchor; then creates a three-dimensional model of the virtual image anchor according to the face three-dimensional model and the body three-dimensional model of the virtual image anchor; creates a three-dimensional model of a scene according to selected scene information; and creates and plays the virtual image video according to the three-dimensional model of the virtual image anchor and the three-dimensional model of the scene.

At S102, detecting whether an instruction for adjusting a current position of a virtual camera is received while the video is playing.

In some embodiments, the detecting whether an instruction for adjusting a current position of a virtual camera is received may include that: it is detected whether a preset adjustment key for adjusting a position of a virtual camera in a keyboard is pressed by a user, and if it is detected that the preset adjustment key is pressed, the instruction for adjusting the position of the virtual camera is received; or, it is detected whether a preset adjustment key for adjusting a position of a virtual camera in a virtual rocker is pressed by a user, and if it is detected that the preset adjustment key is pressed, the instruction for adjusting the position of the virtual camera is received.

At S103, acquiring first target coordinate information of the virtual camera based on the instruction in response to that the instruction is detected to be received.

At S104, moving the virtual camera from the current position to a first target coordinate position based on the first target coordinate information.

At S105, acquiring a first convex hull corresponding to an anchor of the virtual image, and second convex hulls corresponding to objects in a scene of the video.

In some embodiments, the first convex hull of the virtual image anchor may be: a circumscribed sphere of the three-dimensional model of the virtual image anchor. The second convex hull of each object in the scene may also be a circumscribed sphere of each object. Direct use of the circumscribed sphere as the convex hull of each object in the scene would reduce the complexity of clipping detection and increase the execution speed of the clipping detection, but the accuracy of the clipping detection may be greatly reduced, so that in the actual application, each object in the scene is generally calculated by using a gift wrapping algorithm to obtain the convex hull of each object in the scene.

In some embodiments, the first convex hull of the virtual image anchor may be: a convex hull of the virtual image anchor, which is obtained by calculating the three-dimensional model of the virtual image anchor by using the gift wrapping algorithm.

At S106, detecting whether first image clipping occurs based on the first convex hull and the second convex hulls; if the image clipping occurs, S107 is executed; and if no image clipping occurs, the method is ended.

In some embodiments, the first image clipping occurs when the virtual camera is sheltered by any of the objects located between the virtual camera and the anchor and/or when the virtual camera enters into any of the objects or the anchor.

In some embodiments, the clipping is that a space between the virtual camera and the virtual image anchor is sheltered by other models or the virtual camera directly enters a certain model in the scene to cause a black screen.

In some embodiments, if no image clipping occurs, the target coordinate information of the virtual camera is not adjusted, and the image clipping detection is ended.

In some embodiments, the detecting whether the first image clipping occurs based on the first convex hull and the second convex hulls includes: detecting whether second image clipping occurs in an image of the anchor based on the first convex hull; and moving the virtual camera from the first target coordinate position to an undetermined position in response to that the second image clipping occurs, where the second image clipping does not occurs in the image of the anchor on the undetermined position; acquiring a third convex hull corresponding to the virtual camera at the undetermined position; detecting whether third image clipping occurs in the scene based on the third convex hull and the second convex hulls; determining that the first image clipping occurs in response to that the third image clipping occurs; and determining that the first image clipping does not occur in response to that the third image clipping does not occur; or acquiring a fourth convex hull corresponding to the virtual camera at the first target coordinate position in response to that the second image clipping does not occur; detecting whether the third image clipping occurs based on the fourth convex hull and the second convex hulls; determining that the first image clipping occurs in response to that the third image clipping occurs; and determining that the first image clipping does not occur in response to that the third image clipping does not occur.

At S107, acquiring second target coordinate information by adjusting the first target coordinate information in response to that the first image clipping is detected to be occurred; and moving the virtual camera from the first target coordinate position to a second target coordinate position, where the first image clipping does not occur, based on the second target coordinate information.

The technical solutions provided by the embodiments of the present disclosure can realize that the watching client can detect an adjustment instruction for adjusting a position of the virtual camera in the process of playing the virtual image video, and adjust the position of the virtual camera according to this instruction. Furthermore, the technical solutions can also realize that the image clipping is detected in the process of adjusting the position of the virtual camera, and the position of the virtual camera is adjusted under the condition that the clipping occurs so that the user can watch the virtual image video in multiple angles, and no clipping phenomenon occurs when the user adjusts the watching angle as required, thereby improving the user experience.

The method for live broadcasting a virtual image provided by the embodiments of the present disclosure is further described in detail as following.

Figure 2:
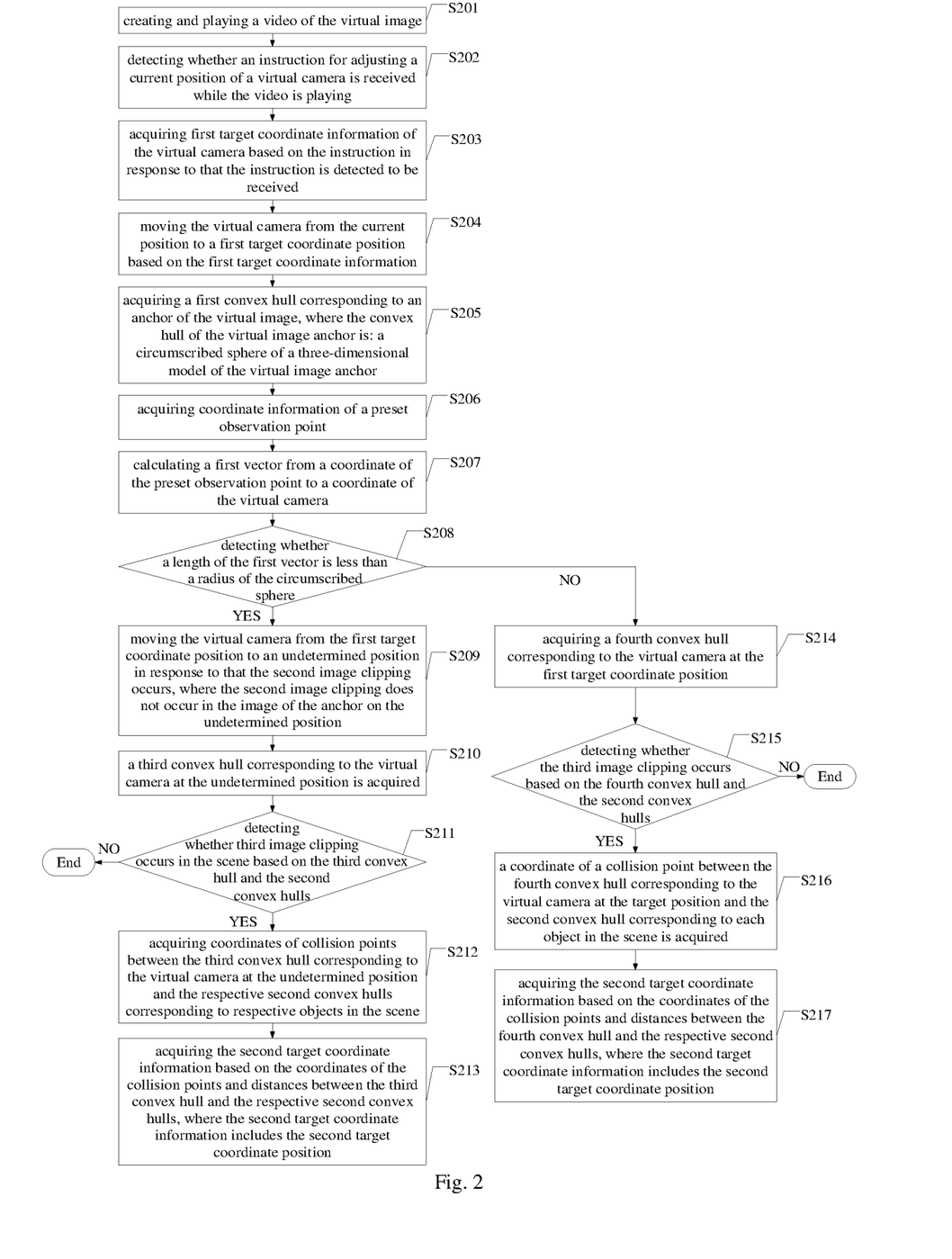
FIG. 2 is a flow diagram of another method for live broadcasting a virtual image according to an embodiment of the present disclosure.

FIG. 2 is a flow diagram of another method for live broadcasting a virtual image according to an embodiment of the present disclosure. The method includes following operations.

At S201, creating and playing a video of the virtual image.

At S202, detecting whether an instruction for adjusting a current position of a virtual camera is received while the video is playing.

At S203, acquiring first target coordinate information of the virtual camera based on the instruction in response to that the instruction is detected to be received.

At S204, moving the virtual camera from the current position to a first target coordinate position based on the first target coordinate information.

At S205, acquiring a first convex hull corresponding to an anchor of the virtual image, where the convex hull of the virtual image anchor is: a circumscribed sphere of a three-dimensional model of the virtual image anchor.

At S206, acquiring coordinate information of a preset observation point.

In some embodiments, the preset observation point may be a fixed point on the body of the virtual image anchor. For example, it can be set that the neck of the anchor is the observation point. The orientation of the virtual camera may be fixed, and the virtual camera always faces the observation point.

At S207, calculating a first vector from a coordinate of the preset observation point to a coordinate of the virtual camera.

At S208, detecting whether a length of the first vector is less than a radius of the circumscribed sphere; if the length of the first vector is less than the radius of the circumscribed sphere of the virtual image anchor, it is determined that the second image clipping occurs, and S209 is executed; and if the length of the first vector is not less than the radius of the circumscribed sphere of the virtual image anchor, it is determined that the second image clipping does not occur, and S214 is executed.

At S209, moving the virtual camera from the first target coordinate position to an undetermined position in response to that the second image clipping occurs, where the second image clipping does not occurs in the image of the anchor on the undetermined position.

The undetermined position may be a coordinate position that causes a vector direction from the coordinate of the observation point to the coordinate of the virtual camera to be unchanged and causes a vector length from the coordinate of the observation point to the coordinate of the virtual camera to be equal to the radius of the circumscribed sphere of the virtual image anchor.

For example, it is set that the coordinate of the observation point, i.e., the coordinate of the neck of the anchor, is a, and a target three-dimensional coordinate of the virtual camera is b; a radial dir is constructed in the ab direction; if the vector length labl between a and b is less than the radius r of the circumscribed sphere of a character, it is indicated that the virtual camera is too close to the character, and has penetrated into the three-dimensional model of the character, and the position of the virtual camera is adjusted to the undetermined position where the image of the virtual image anchor does not have the clipping. Specifically, it can be set that labl is equal to r*normalize(ab), wherein the function normalize ( ) is a normalized function used to cause the vector direction from the target three-dimensional coordinate of the virtual camera to the coordinate of the observation point to be unchanged and cause the vector length to be changed into 1.

At S210, a third convex hull corresponding to the virtual camera at the undetermined position is acquired.

The convex hull of the virtual camera may be obtained by calculating the three-dimensional model of the virtual camera according to a preset size and shape of the virtual camera by using the gift wrapping algorithm.

At S211, detecting whether third image clipping occurs in the scene based on the third convex hull and the second convex hulls if the third image clipping occurs, S212 is executed; and if the third image clipping does not occur, the method is ended.

In some embodiments, the detecting whether the third image clipping occurs based on the third convex hull and the second convex hulls may include that: collision detection is performed on the third convex hull corresponding to the virtual camera at the undetermined position and the second convex hull corresponding to each object in the scene; if the third convex hull and the second convex hull corresponding to each object in the scene do not have the collision, it is determined that the third image clipping does not occur in the scene image; and if the third convex hull and the second convex hull corresponding to any object in the scene have the collision, it is determined that the third image clipping occurs in the scene image.

Specifically, the detecting whether the third image clipping occurs based on the third convex hull and the second convex hulls includes: detecting whether an intersecting point exists between the third convex hull and respective second convex hulls; determining the third image clipping does not occur in response to that the intersecting point does not exist between the third convex hull and the respective second convex hulls; and determining the third image clipping occurs in response to that the intersecting point exists between the third convex hull and any one of the second convex hulls.

In the actual application, it also may be selected to perform coarse granularity collision detection or fine granularity collision detection according to an actual situation during the collision detection. The coarse granularity collision detection may be an octree segmentation algorithm, and the fine granularity collision detection may be a GJK algorithm.

At S212, acquiring coordinates of collision points between the third convex hull corresponding to the virtual camera at the undetermined position and the respective second convex hulls corresponding to respective objects in the scene.

At S213, acquiring the second target coordinate information based on the coordinates of the collision points and distances between the third convex hull and the respective second convex hulls, where the second target coordinate information includes the second target coordinate position, and the method is ended. For example, the coordinate of the collision point where the third convex hull and the second convex hulls corresponding to respective objects in the scene are closest is regarded as a target coordinate of the virtual camera.

At S214, acquiring a fourth convex hull corresponding to the virtual camera at the first target coordinate position.

At S215, detecting whether the third image clipping occurs based on the fourth convex hull and the second convex hulls; determining that the first image clipping occurs in response to that the third image clipping occurs, S216 is executed; and determining that the first image clipping does not occur in response to that the third image clipping does not occur, the method is ended.

In some embodiments, the step that it is detected whether the scene image has the clipping according to the fourth convex hull and the second convex hull corresponding to each object in the scene may include that: collision detection is performed on the fourth convex hull corresponding to the virtual camera at the target position and the second convex hull corresponding to each object in the scene; if the fourth convex hull and the second convex hull corresponding to each object in the scene do not have the clipping, it is determined that the scene image does not have the clipping; and if the fourth convex hull and the second convex hull corresponding to any object in the scene have the clipping, it is determined that the scene image has the clipping.

Specifically, the detecting whether the third image clipping occurs based on the fourth convex hull and the second convex hulls includes: detecting whether an intersecting point exists between the fourth convex hull and the respective second convex hulls; determining the third image clipping does not occur in response to that the intersecting point does not exist between the fourth convex hull and the respective second convex hulls; and determining the third image clipping occurs in response to that the intersecting point exists between the fourth convex hull and any one of the second convex hulls.

At S216, a coordinate of a collision point between the fourth convex hull corresponding to the virtual camera at the target position and the second convex hull corresponding to each object in the scene is acquired.

The collision point is an intersecting point between two convex hulls subjected to the collision detection. The collision detection is to detect whether an intersecting point exists between the two convex hulls.

At S217, acquiring the second target coordinate information based on the coordinates of the collision points and distances between the fourth convex hull and the respective second convex hulls, where the second target coordinate information includes the second target coordinate position, and the method is ended. For example, the coordinate of the collision point where the fourth convex hull and the second convex hulls corresponding to respective objects in the scene are closest is regarded as a target coordinate of the virtual camera.

Figure 3:
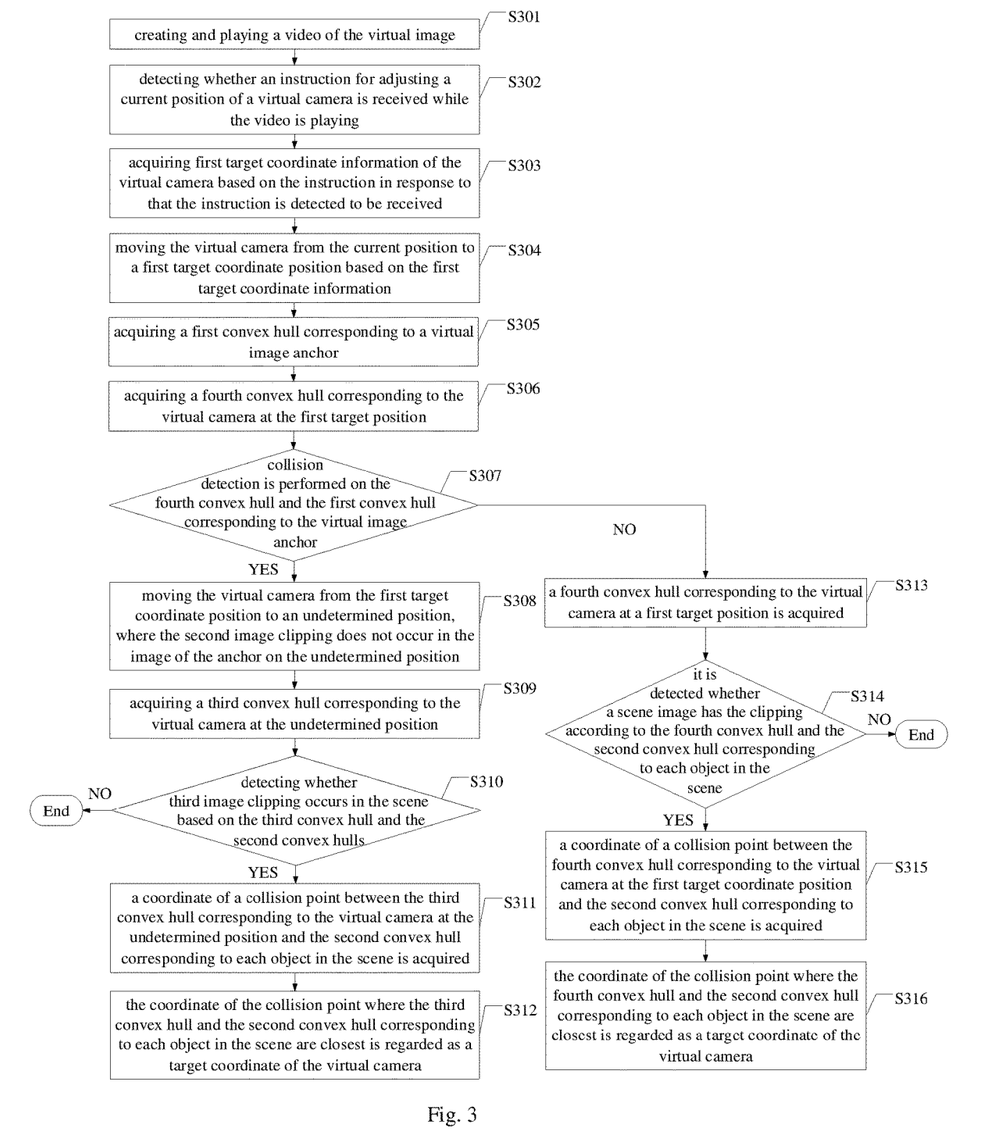
FIG. 3 is a flow diagram of a further method for live broadcasting a virtual image according to an embodiment of the present disclosure.

FIG. 3 is a flow diagram of a further method for live broadcasting a virtual image according to an embodiment of the present disclosure. The method includes the following operations.

At S301, creating and playing a video of the virtual image.

At S302, detecting whether an instruction for adjusting a current position of a virtual camera is received while the video is playing.

At S303, acquiring first target coordinate information of the virtual camera based on the instruction in response to that the instruction is detected to be received.

At S304, moving the virtual camera from the current position to a first target coordinate position based on the first target coordinate information.

At S305, acquiring a first convex hull corresponding to a virtual image anchor, where the first convex hull of the virtual image anchor is: a convex hull of the virtual image anchor, which is obtained by calculating a three-dimensional model of the virtual image anchor by using a gift wrapping algorithm.

At S306, acquiring a fourth convex hull corresponding to the virtual camera at the first target position.

At S307, collision detection is performed on the fourth convex hull and the first convex hull corresponding to the virtual image anchor; if the fourth convex hull and the first convex hull of the virtual image anchor have the collision, it is determined that the second image clipping occurs, and S308 is executed; and if the fourth convex hull and the first convex hull of the virtual image anchor do not have the collision, it is determined that the second image clipping does not occur, and S313 is executed.

At S308, moving the virtual camera from the first target coordinate position to an undetermined position, where the second image clipping does not occurs in the image of the anchor on the undetermined position.

The undetermined position is a coordinate position of a collision point where the convex hull of the virtual camera and the convex hull of the virtual image anchor are closest.

At S309, acquiring a third convex hull corresponding to the virtual camera at the undetermined position.

At S310, detecting whether third image clipping occurs in the scene based on the third convex hull and the second convex hulls; determining that the first image clipping occurs in response to that the third image clipping occurs, S311 is executed; and determining that the first image clipping does not occur in response to that the third image clipping does not occur, the method is ended.

At S311, a coordinate of a collision point between the third convex hull corresponding to the virtual camera at the undetermined position and the second convex hull corresponding to each object in the scene is acquired.

At S312, the coordinate of the collision point where the third convex hull and the second convex hull corresponding to each object in the scene are closest is regarded as a target coordinate of the virtual camera, and the method is ended.

At S313, a fourth convex hull corresponding to the virtual camera at a first target position is acquired.

At S314, it is detected whether a scene image has the clipping according to the fourth convex hull and the second convex hull corresponding to each object in the scene; if it is determined that the image clipping occurs, S315 is executed; and if it is determined that no image clipping occurs, the method is ended.

At S315, a coordinate of a collision point between the fourth convex hull corresponding to the virtual camera at the first target coordinate position and the second convex hull corresponding to each object in the scene is acquired.

At S316, the coordinate of the collision point where the fourth convex hull and the second convex hull correspond-ing to each object in the scene are closest is regarded as a target coordinate of the virtual camera, and the method is ended.

The technical solutions provided by the embodiments of the present disclosure can realize that the watching client can detect the adjustment instruction for adjusting the position of the virtual camera in the process of playing the virtual image video, and adjust the position of the virtual camera according to this instruction. Furthermore, the technical solutions can also realize that the image clipping is detected in the process of adjusting the position of the virtual camera, and the position of the visual camera is adjusted under the condition that the clipping occurs so that the user can watch the virtual image video in multiple angles, and no clipping phenomenon occurs when the user adjusts the watching angle as required, thereby improving the user experience.

Figure 4:
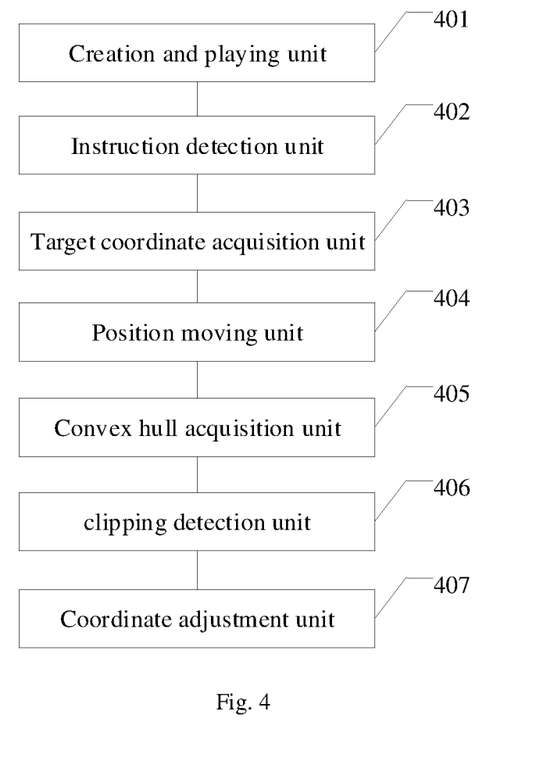
FIG. 4 is a block diagram of a device for live broadcasting a virtual image according to an embodiment of the present disclosure.

FIG. 4 is a block diagram of a device for live broadcasting a virtual image according to an embodiment of the present disclosure. The device is applied to a watching client.

Referring to FIG. 4, the device includes a creation and playing unit 401, an instruction detection unit 402, a target coordinate acquisition unit 403, a position moving unit 404, a convex hull acquisition unit 405, a clipping detection unit 406 and a coordinate adjustment unit 407.

The creation and playing unit 401 is configured to create and play a video of the virtual image.

The instruction detection unit 402 is configured to detect whether an instruction for adjusting a current position of a virtual camera is received while the video is playing.

The target coordinate acquisition unit 403 is configured to acquire first target coordinate information of the virtual camera based on the instruction in response to that the instruction is detected to be received.

The position moving unit 404 is configured to move the virtual camera from the current position to a first target coordinate position based on the first target coordinate information.

The convex hull acquisition unit 405 is configured to acquire a first convex hull corresponding to an anchor of the virtual image and second convex hulls corresponding to objects in a scene of the video.

The clipping detection unit 406 is configured to detect whether first image clipping occurs based on the first convex hull and the second convex hulls. The image clipping is that a space between the virtual camera and the virtual image anchor is sheltered by other models or the virtual camera directly enters a certain model in the scene to cause a black screen.

The coordinate adjusting unit 407 is configured to acquire second target coordinate information by adjusting the first target coordinate information in response to that the first image clipping is detected to be occurred, and move the virtual camera from the first target coordinate position to a second target coordinate position, where the first image clipping does not occur, based on the second target coordinate information.

Figure 5:
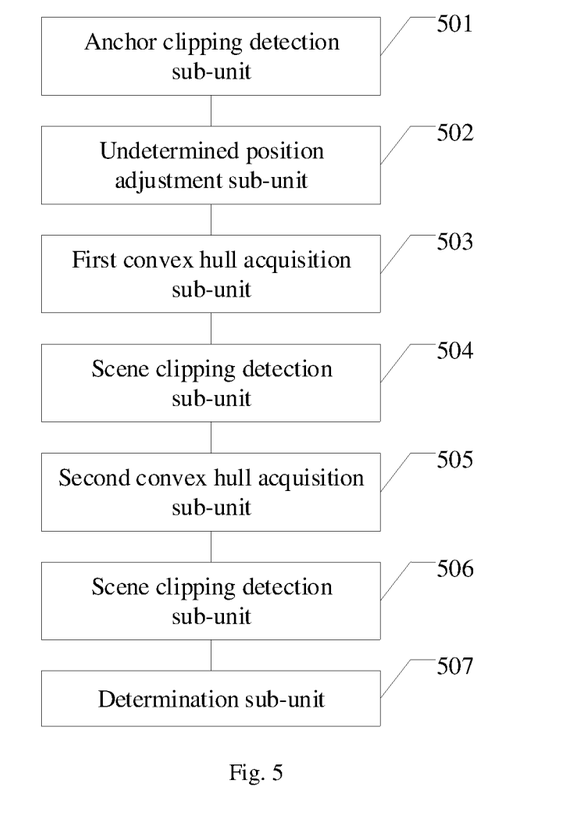
FIG. 5 is a block diagram of a clipping detection unit according to an embodiment of the present disclosure.

Referring to FIG. 5, in some embodiments, the clipping detection unit 406 includes an anchor clipping detection sub-unit 501, an undetermined position adjustment sub-unit 502, a first convex hull acquisition sub-unit 503, a scene clipping detection sub-unit 504 and a determination sub-unit 507.

The anchor clipping detection sub-unit 501 is configured to detect whether second image clipping occurs in an image of the anchor based on the first convex hull.

The undetermined position adjustment sub-unit 502 is configured to move the virtual camera from the first target coordinate position to an undetermined position in response to that the second image clipping occurs, where the second image clipping does not occurs in the image of the anchor on the undetermined position.

The first convex hull acquisition sub-unit 503 is configured to a third convex hull corresponding to the virtual camera at the undetermined position.

The scene clipping detection sub-unit 504 is configured to detect whether third image clipping occurs in the scene based on the third convex hull and the second convex hulls.

The determination sub-unit 507 is configured to determine that the first image clipping occurs in response to that the third image clipping occurs, and determine that the first image clipping does not occur in response to that the third image clipping does not occur.

Referring to FIG. 5, in some embodiments, the clipping detection unit 406 further includes: a second convex hull acquisition sub-unit 505 and a scene clipping detection sub-unit 506.

The second convex hull acquisition sub-unit 505 is configured to acquire a fourth convex hull corresponding to the virtual camera at the first target coordinate position in response to that the second image clipping does not occur.

The scene clipping detection sub-unit 506 is further configured to detect whether the third image clipping occurs based on the fourth convex hull and the second convex hulls.

In some embodiments, the convex hull of the virtual image anchor is: a circumscribed sphere of a three-dimensional model of the virtual image anchor.

The anchor clipping detection sub-unit 501 is configured to: acquire coordinate information of a preset observation point, where the preset observation point is a fixed point on the body of the virtual image anchor, calculate a first vector from a coordinate of the preset observation point to a coordinate of the virtual camera, detect whether a length of the first vector is less than a radius of the circumscribed sphere of the virtual image anchor, if the length of the first vector is less than the radius of the circumscribed sphere of the virtual image anchor, determine that the second image clipping occurs, and if the length of the first vector is not less than the radius of the circumscribed sphere of the virtual image anchor, determine that the second image clipping does not occur.

In some embodiments, the convex hull of the virtual image anchor is: a convex hull of the virtual image anchor, which is obtained by calculating a three-dimensional model of the virtual image anchor by using a gift wrapping algorithm.

The anchor clipping detection sub-unit 501 is configured to: acquire a fourth convex hull corresponding to the virtual camera at the first target coordinate position, detect whether an intersecting point exists between the fourth convex hull and the first convex hull, determine the second image clipping occurs in response to that the intersecting point exists between the fourth convex hull and the first convex hull, and determine the second image clipping does not occur in response to that the intersecting point does not exist between the fourth convex hull and the first convex hull. In some embodiments, the undetermined position is a coordinate position that: causes a vector direction from the coordinate of the preset observation point to the coordinate of the virtual camera to be unchanged; and causes a vector length from the coordinate of the preset observation point to the coordinate of the virtual camera to be equal to the radius of the circumscribed sphere.

In some embodiments, the undetermined position is a coordinate position of a collision point where a convex hull of the virtual camera and a convex hull of the anchor are closest, where the collision point is a point where the convex hull of the virtual camera and the convex hull of the anchor intersect.

In some embodiments, the scene clipping detection sub-unit 504 is configured to: detect whether an intersecting point exists between the third convex hull and respective second convex hulls, determine the third image clipping does not occur in response to that the intersecting point does not exist between the third convex hull and the respective second convex hulls, and determine the third image clipping occurs in response to that the intersecting point exists between the third convex hull and any one of the second convex hulls.

In some embodiments, the undetermined position adjustment sub-unit 502 is configured to perform: acquiring coordinates of collision points between the third convex hull and the respective second convex hulls, and acquiring the second target coordinate information based on the coordinates of the collision points and distances between the third convex hull and the respective second convex hulls, where the second target coordinate information includes the second target coordinate position.

In some embodiments, the scene clipping detection sub-unit 504 may be configured to perform: detecting whether an intersecting point exists between the fourth convex hull and the respective second convex hulls, determining the third image clipping does not occur in response to that the intersecting point does not exist between the fourth convex hull and the respective second convex hulls, and determining the third image clipping occurs in response to that the intersecting point exists between the fourth convex hull and any one of the second convex hulls.

In some embodiments, the undetermined position adjustment sub-unit 502 may be configured to perform: acquiring coordinates of collision points between the fourth convex hull and the respective second convex hulls, and acquiring the second target coordinate information based on the coordinates of the collision points and distances between the fourth convex hull and the respective second convex hulls, where the second target coordinate information includes the second target coordinate position.

The device provided by the embodiments of the present disclosure can realize that the watching client can detect the adjustment instruction for detecting the position of the virtual camera in the process of playing the virtual image video, and adjust the position of the virtual camera according to this instruction. Furthermore, the technical solutions can also realize that the image clipping is detected in the process of adjusting the position of the virtual camera, and the position of the virtual camera is adjusted under the condition that the clipping occurs so that the user can watch the virtual image video in multiple angles, and no clipping phenomenon occurs when the user adjusts the watching angle as required, thereby improving the user experience.

Figure 6:
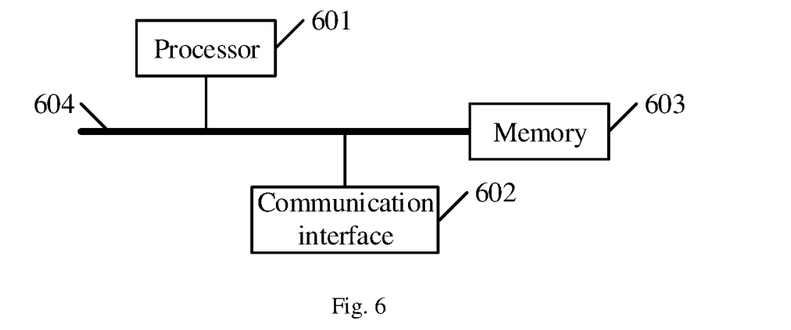
FIG. 6 is a block diagram of an electronic device according to an embodiment of the present disclosure.

FIG. 6 is a block diagram of an electronic device illustrated according to an exemplary embodiment. As shown in FIG. 6, the electronic device may include: at least one processor 601, a communication interface 602, a memory 603 and a communication bus 604. The processor 601, the communication interface 602 and the memory 603 complete inter-communication through the communication bus 604.

The memory 603 is configured to store a computer program.

The processor 601 is configured to perform a method for live broadcasting a virtual image in the above embodiments when executing the program stored in the memory 603.

The electronic device provided by the embodiment of the present disclosure can realize that the watching client can detect the virtual camera position adjustment instruction in the process of playing the virtual image video, and adjust the position of the virtual camera according to this instruction. Furthermore, the technical solutions can also realize that the image clipping is detected in the process of adjusting the position of the virtual camera, and the position of the virtual camera is adjusted under the condition that the clipping occurs so that the user can watch the virtual image video in multiple angles, and no clipping phenomenon occurs when the user adjusts the watching angle as required, thereby improving the user experience.

The communication bus mentioned in the above electronic device may be a peripheral component interconnect (PCI) bus or an extended industry standard architecture (EISA) bus, and the like. The communication bus can be divided into an address bus, a data bus, a control bus, and the like. For ease of representation, only a thick line is used in the figure, but it does not mean that there is only one bus or one type of bus.

The communication interface is used for communication between the above electronic device and other devices.

The memory may include a random access memory (RAM), or a non-volatile memory (NVM), for example, at least one disk memory. Optionally, the memory may also be at least one storage apparatus located away from the foregoing processor.

The foregoing processor may be a general-purpose processor, including a central processing unit (CPU), a network processor (NP), etc.; or a digital signal processor (DSP), an application specific integrated circuit (ASIC), a field-programmable gate array (FPGA) or other programmable logic devices, discrete gate or transistor logic devices, and discrete hardware components.

In another embodiment provided by the present disclosure, a non-transitory computer readable storage medium is further provided. The computer readable storage medium stores one or more computer programs. The computer program, when executed by the processor, realizes the steps of any one of the methods for live broadcasting a virtual image.

In another embodiment provided by the present disclosure, a computer program product including an instruction is further provided. The computer program product, when operated on a computer, causes the computer to implement any one of the methods for live broadcasting a virtual image in the above embodiments.

Those skilled in the art will easily think of other implementation solutions of the present disclosure after considering the specification and practicing the invention disclosed herein. The application is intended to cover any variations, uses, or adaptive changes of the present disclosure. These variations, uses, or adaptive changes follow the general principles of the present disclosure and include common general knowledge or conventional technical means in the technical field, which are not disclosed in the present disclosure. The specification and the embodiments are considered to be exemplary only, with a true scope and spirit of the present disclosure being indicated by the following claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. A method for live broadcasting a virtual avatar, applied to a watching client, the method comprising:
    creating and playing a video of the virtual avatar;
    detecting whether an instruction for adjusting a current position of a virtual camera is received while the video is playing;
    acquiring first target coordinate information of the virtual camera based on the instruction in response to detecting that the instruction is received;
    moving the virtual camera from the current position to a first target coordinate position based on the first target coordinate information;
    acquiring a first convex hull corresponding to an anchor of the virtual avatar;
    acquiring second convex hulls corresponding to objects in a scene of the video;
    detecting whether first image penetration occurs based on the first convex hull and the second convex hulls, wherein the first image penetration occurs when the virtual camera is sheltered by any of the objects located between the virtual camera and the anchor and/or when the virtual camera enters into any of the objects or the anchor;
    acquiring second target coordinate information by adjusting the first target coordinate information in response to detecting that the first image penetration has occurred; and
    moving the virtual camera from the first target coordinate position to a second target coordinate position, where the first image penetration does not occur, based on the second target coordinate information;
    wherein the detecting of whether the first image penetration occurs based on the first convex hull and the second convex hulls comprises:
        detecting whether second image penetration occurs in an image of the anchor based on the first convex hull,
        moving the virtual camera from the first target coordinate position to an undetermined position in response to the second image penetration occurring, wherein the second image penetration does not occur in the image of the anchor on the undetermined position,
        acquiring a third convex hull corresponding to the virtual camera at the undetermined position,
        detecting whether third image penetration occurs in the scene based on the third convex hull and the second convex hulls,
        determining that the first image penetration occurs in response to the third image penetration occurring, and
        determining that the first image penetration does not occur in response to the third image penetration not occurring.

2. The method according to claim 1, further comprising:
    acquiring a fourth convex hull corresponding to the virtual camera at the first target coordinate position in response to the second image penetration not occurring;
    detecting whether the third image penetration occurs based on the fourth convex hull and the second convex hulls;
    determining that the first image penetration occurs in response to the third image penetration occurring; and
    determining that the first image penetration does not occur in response to the third image penetration not occurring.

3. The method according to claim 2, wherein said detecting whether the third image penetration occurs based on the fourth convex hull and the second convex hulls comprises:
  detecting whether an intersecting point exists between the fourth convex hull and the respective second convex hulls;
  determining the third image penetration does not occur in response to the intersecting point not existing between the fourth convex hull and the respective second convex hulls; and
  determining the third image penetration occurs in response to the intersecting point existing between the fourth convex hull and any one of the second convex hulls.

4. The method according to claim 3, wherein said acquiring the second target coordinate information comprises:
  acquiring coordinates of collision points between the fourth convex hull and the respective second convex hulls; and
  acquiring the second target coordinate information based on the coordinates of the collision points and distances between the fourth convex hull and the respective second convex hulls, wherein the second target coordinate information comprises the second target coordinate position.

5. The method according to claim 1, wherein
  the first convex hull is: a circumscribed sphere of a three-dimensional model of the anchor; and
  said detecting whether the second image penetration occurs in the image of the anchor based on the first convex hull comprises:
  acquiring coordinate information of a preset observation point, wherein the preset observation point is a fixed point on the anchor;
  calculating a first vector from a coordinate of the preset observation point to a coordinate of the virtual camera;
  detecting whether a length of the first vector is less than a radius of the circumscribed sphere;
  determining that the second image penetration occurs in response to the length of the first vector being less than the radius of the circumscribed sphere; and
  determining that the second image penetration does not occur in response to the length of the first vector being not less than the radius of the circumscribed sphere.

6. The method according to claim 5, wherein
  the undetermined position is a coordinate position that:
  causes a vector direction from the coordinate of the preset observation point to the coordinate of the virtual camera to be unchanged; and
  causes a vector length from the coordinate of the preset observation point to the coordinate of the virtual camera to be equal to the radius of the circumscribed sphere.

7. The method according to claim 1, wherein
  the first convex hull is: a convex hull calculated based on a three-dimensional model of the anchor and a gift wrapping algorithm; and
  said detecting whether the second image penetration occurs in the image of the anchor based on the first convex hull comprises:
  acquiring a fourth convex hull corresponding to the virtual camera at the first target coordinate position;
  detecting whether an intersecting point exists between the fourth convex hull and the first convex hull;
  determining the second image penetration occurs in response to the intersecting point existing between the fourth convex hull and the first convex hull; and
  determining the second image penetration does not occur in response to the intersecting point not existing between the fourth convex hull and the first convex hull.

8. The method according to claim 7, wherein
  the undetermined position is a coordinate position of a collision point where a convex hull of the virtual camera and a convex hull of the anchor are closest, wherein the collision point is a point where the convex hull of the virtual camera and the convex hull of the anchor intersect.

9. The method according to claim 1, wherein said detecting whether the third image penetration occurs based on the third convex hull and the second convex hulls comprises:
  detecting whether an intersecting point exists between the third convex hull and respective second convex hulls;
  determining the third image penetration does not occur in response to the intersecting point not existing between the third convex hull and the respective second convex hulls; and
  determining the third image penetration occurs in response to the intersecting point existing between the third convex hull and any one of the second convex hulls.

10. The method according to claim 9, wherein said acquiring the second target coordinate information comprises:
  acquiring coordinates of collision points between the third convex hull and the respective second convex hulls; and
  acquiring the second target coordinate information based on the coordinates of the collision points and distances between the third convex hull and the respective second convex hulls, wherein the second target coordinate information comprises the second target coordinate position.

11. A device for live broadcasting a virtual avatar, comprising a memory and at least one processor, wherein the at least one processor is configured to read and execute instructions stored in the memory to perform following operations:
  creating and playing a video of the virtual avatar;
  detecting whether an instruction for adjusting a current position of a virtual camera is received while the video is playing;
  acquiring first target coordinate information of the virtual camera based on the instruction in response to detecting that the instruction is received;
  moving the virtual camera from the current position to a first target coordinate position based on the first target coordinate information;
  acquiring a first convex hull corresponding to an anchor of the virtual avatar;
  acquiring second convex hulls corresponding to objects in a scene of the video;
  detecting whether first image penetration occurs based on the first convex hull and the second convex hulls, wherein the first image penetration occurs when the virtual camera is sheltered by any of the objects located between the virtual camera and the anchor and/or when the virtual camera enters into any of the objects or the anchor;
  acquiring second target coordinate information by adjusting the first target coordinate information in response to detecting that the first image penetration has occurred; and
  moving the virtual camera from the first target coordinate position to a second target coordinate position, where the first image penetration does not occur, based on the second target coordinate information;
wherein the at least one processor is further configured to read and execute instructions stored in the memory to perform following operations:
  detecting whether second image penetration occurs in an image of the anchor based on the first convex hull;
  moving the virtual camera from the first target coordinate position to an undetermined position in response to the second image penetration occurring, wherein the second image penetration does not occurs in the image of the anchor on the undetermined position;
  acquiring a third convex hull corresponding to the virtual camera at the undetermined position;
  detecting whether third image penetration occurs in the scene based on the third convex hull and the second convex hulls;
  determining that the first image penetration occurs in response to the third image penetration occurring; and
  determining that the first image penetration does not occur in response to the third image penetration not occurring.

12. The device according to claim 11, wherein the at least one processor is further configured to read and execute instructions stored in the memory to perform following operations:
  acquiring a fourth convex hull corresponding to the virtual camera at the first target coordinate position in response to the second image penetration not occurring;
  detecting whether the third image penetration occurs based on the fourth convex hull and the second convex hulls;
  determining that the first image penetration occurs in response to the third image penetration occurring; and
  determining that the first image penetration does not occur in response to the third image penetration not occurring.

13. The device according to claim 11, wherein the at least one processor is further configured to read and execute instructions stored in the memory to perform following operations:
  the first convex hull is: a circumscribed sphere of a three-dimensional model of the anchor; and
  said detecting whether the second image penetration occurs in the image of the anchor based on the first convex hull comprises:
  acquiring coordinate information of a preset observation point, wherein the preset observation point is a fixed point on the anchor;
  calculating a first vector from a coordinate of the preset observation point to a coordinate of the virtual camera;
  detecting whether a length of the first vector is less than a radius of the circumscribed sphere;
  determining that the second image penetration occurs in response to the length of the first vector being less than the radius of the circumscribed sphere; and
  determining that the second image penetration does not occur in response to the length of the first vector not being less than the radius of the circumscribed sphere;
  wherein the undetermined position is a coordinate position that:
  causes a vector direction from the coordinate of the preset observation point to the coordinate of the virtual camera to be unchanged; and
  causes a vector length from the coordinate of the preset observation point to the coordinate of the virtual camera to be equal to the radius of the circumscribed sphere.

14. The device according to claim 11, wherein the at least one processor is further configured to read and execute instructions stored in the memory to perform following operations:
  the first convex hull is: a convex hull calculated based on a three-dimensional model of the anchor and a gift wrapping algorithm; and
  said detecting whether the second image penetration occurs in the image of the anchor based on the first convex hull comprises:
  acquiring a fourth convex hull corresponding to the virtual camera at the first target coordinate position;
  detecting whether an intersecting point exists between the fourth convex hull and the first convex hull;
  determining the second image penetration occurs in response to the intersecting point existing between the fourth convex hull and the first convex hull; and
  determining the second image penetration does not occur in response to the intersecting point not existing between the fourth convex hull and the first convex hull;
  wherein the undetermined position is a coordinate position of a collision point where a convex hull of the virtual camera and a convex hull of the anchor are closest, wherein the collision point is a point where the convex hull of the virtual camera and the convex hull of the anchor intersect.

15. The device according to claim 11, wherein the at least one processor is further configured to read and execute instructions stored in the memory to perform following operations:
  detecting whether an intersecting point exists between the third convex hull and respective second convex hulls;
  determining the third image penetration does not occur in response to the intersecting point not existing between the third convex hull and the respective second convex hulls; and
  determining the third image penetration occurs in response to the intersecting point existing between the third convex hull and any one of the second convex hulls.

16. The device according to claim 15, wherein the at least one processor is further configured to read and execute instructions stored in the memory to perform following operations:
  acquiring coordinates of collision points between the third convex hull and the respective second convex hulls; and
  acquiring the second target coordinate information based on the coordinates of the collision points and distances between the third convex hull and the respective second convex hulls, wherein the second target coordinate information comprises the second target coordinate position.

17. The device according to claim 11, wherein the at least one processor is further configured to read and execute instructions stored in the memory to perform following operations:
  detecting whether an intersecting point exists between the fourth convex hull and the respective second convex hulls;

determining the third image penetration does not occur in response to the intersecting point not existing between the fourth convex hull and the respective second convex hulls; and determining the third image penetration occurs in response to the intersecting point existing between the fourth convex hull and any one of the second convex hulls.

18. The device according to claim 17, wherein the at least one processor is further configured to read and execute instructions stored in the memory to perform following operations:

acquiring coordinates of collision points between the fourth convex hull and the respective second convex hulls; and acquiring the second target coordinate information based on the coordinates of the collision points and distances between the fourth convex hull and the respective second convex hulls, wherein the second target coordinate information comprises the second target coordinate position.

\* \* \* \* \*